United States Patent Office 3,464,248
Patented Sept. 2, 1969

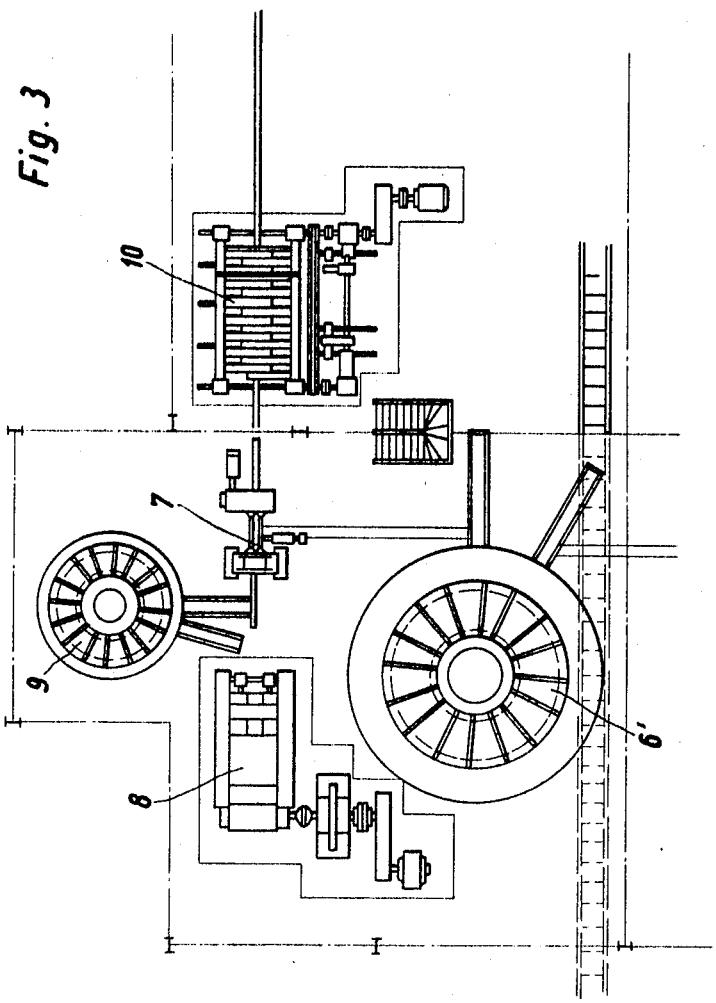

3,464,248
METHOD AND APPARATUS FOR PRODUCING EXTRUSIONS
Kurt Gruber, Monchen-Gladbach, Germany, assignor to Mannesmann-Meer A.G., Monchen-Gladbach, Germany, a corporation of Germany
Filed Nov. 29, 1966, Ser. No. 597,705
Claims priority, application Germany, Aug. 19, 1966, M 70,638
Int. Cl. B21b 45/02
U.S. Cl. 72—42                 5 Claims

ABSTRACT OF THE DISCLOSURE

A method for producing extrusions provides for preheating a glass plate separate from and prior to the extrusion operation, and then inserting the heated glass plate with the hot billet into the extrusion press where the glass will act as the extrusion lubricant. The machine has heating means near the press for the preheating of the glass plate.

---

This invention relates to a method and apparatus for extruding tubes and bars, preferably from steel or steel alloys, using preheated plate shaped discs made of silicates.

When producing tubes and bars from steel or steel alloys by using the conventional extrusion process a high rate of deformation is possible, namely the relation of cross section of the billet to that of the desired tube or bar may be between 25 and 50, depending on the quality of the steel.

These high rates of transformation and the relatively high extruding temperatures of from 1000° C. to 1250° C. cause great tool stresses. Particularly when making steel tubes, the mandrel and the die are very highly stressed due to the surface pressure, the heat stress, and the occurring friction.

In order to check the heat transfer from the hot billet to the tools and to reduce friction, lubricants are used. Cold lubricants containing graphite have been placed between the billet and the mandrel immediately prior to the pressure-shaping process. Lubrication with substances containing graphite has been satisfactory in connection with solid billets and upright presses, particularly when working conventional carbon steels.

When using heavy billets weighing more than about 300 kg. and when using hollow billets horizontal hydraulic extruding presses must be used. Uniform distribution of lubricants containing graphite, however, is very difficult in horizontal presses.

When using punched or bored, hollow billets the oxygen of the air has free access to the receiving chamber and causes premature and undesired combustion of the graphite. There is, furthermore, always the danger of carburization by diffusion of the carbon into the marginal zone of the hot billet.

It has, therefore, been proposed to use so called viscous lubricants which are preferably composed of glasslike silicates. These kinds of lubricants are placed between the billet and the extrusion die and, as the case may be, between the billet and the extrusion ram. Measured amounts of cold glass powder or, particularly in horizontal presses, plate shaped discs made of sintered glass powder are inserted at heated locations immediately prior to the extruding process.

In this case the hot billet must, however, first heat the glass plate to a temperature which corresponds to the softening temperature of the respective glass, as otherwise the sudden mechanical and thermal impact of the billet on the glass disc would cause fracture thereof into numerous pieces so that the die would not uniformly be covered with the lubricant at the beginning of the press operation. Softening of a marginal layer and raising it to a temperature of from 800° C. to 950° C. must thus be awaited prior to starting the extruding operation. There exists, furthermore, the absolute necessity of matching the extrusion velocity with the melting off velocity of the glass plate in order to produce the desired glass film.

As the heat conductivity of glasslike silicates, however, is very low, the rate of production of the entire plant is limited due to the aforesaid required softening time and melting off velocity.

When producing tubes and bars from common carbon steels, the conditions outlined above impair the economy of the entire process.

This disadvantage is increased by the fact that, when working carbon steels, the formation of scale during the heating process necessitates a thicker glass film.

The different oxidation stages of the scale layer of the billet must be sufficiently absorbed by the elected glass alloy and the resulting glass film without impairing the lubricating and insulating effect.

It is accordingly among the principal objects of the invention to provide a method and apparatus which overcome the aforedescribed disadvantages of conventional processes and apparatus for producing tubes and bars by extrusion.

It is a further object of the invention to provide a method and apparatus for making tubes and bars by extrusion, which method and apparatus operate independently of the softening time and of the melting off velocity of glasslike silicates used for lubrication and insulation, so that the production of the entire plant per time unit is not thereby limited.

It is another object of the invention to provide a process that comprises the steps of preheating to softening temperature the known glass plates, which are located in the conventional manner in front of and behind the billet for lubrication and insulation, and to place the softened glass plates simultaneously with the hot billet into the receiver of the extrusion press.

It is still a further object of the invention to provide suitable heaters, for the aforesaid preheating, adjacent the extrusion press, to preheat the glass plates to the desired softening temperatures, or, more efficiently, to provide glass melting furnaces that have glass feeders which are capable of filling batches of molten glass into molds for making glass plates and delivering the latter at a desired temperature to the extruding apparatus.

The novel features which are considered characteristic of the invention are set forth with particularity in the appended claims. The invention itself, however, and additional objects and advantages thereof will best be understood from the following description of embodiments thereof when read in connection with the accompanying drawings, wherein:

FIG. 3 is a schematic plan view of a plant according to the invention.

Figure 1:
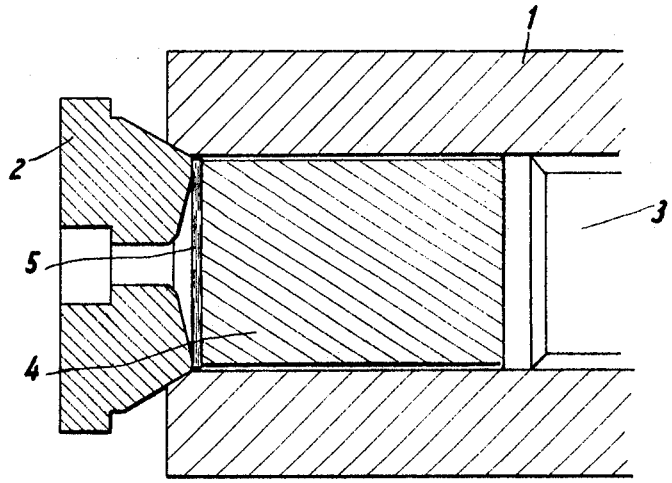
FIG. 1 is a fragmentary longitudinal sectional view of an extrusion press, showing the parts thereof in position before starting the extruding operation.
Figure 2:
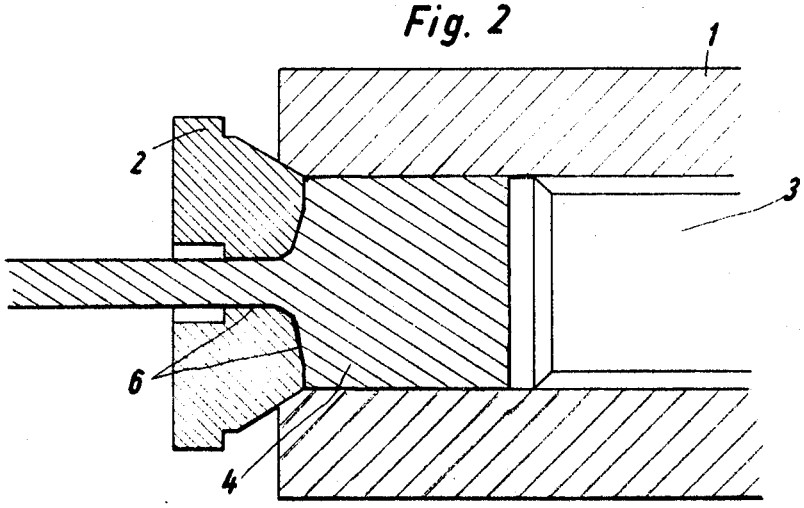
FIG. 2 is a fragmentary sectional view similar to FIG. 1, but showing the parts in position after the ram has been moved a certain distance.

The extrusion press shown in FIGS. 1 and 2 comprises a receiver 1, a die 2, and a ram 3. A billet 4 is positioned between a glass plate 5 and the ram 3, the glass plate 5 being inserted between the billet 4 and the die 2. The plate 5 is preheated and also receives heat from the hot billet 4 so that it is sufficiently softened to form a lubricant film 6, as shown in FIG. 2, when the ram 3 moves towards the die 2, and the billet 4 is deformed by extrusion through the die 2. The film 6 envelopes the working surface of the die 2 and also the extruded work 4 and serves as a lubricant.

Referring more particularly to FIG. 3 of the drawing, there is provided a revolving heater 6' for heating the billets 4. A conventional descaling machine 7 is arranged near an extrusion press 8, and a heater 9 is provided for preheating the glass plates 5 (FIG. 1). The heater 9 may be replaced, for example, by a conventional glass melting furnace with glass feeder and molding machine. A reducing rolling mill 10 may be arranged to receive the extruded material.

The location of the heater 9, or of a glass melting machine with accessories, is so arranged as to afford a most economical operation and to comply with the requirements of the steel mill.

In the process according to the invention, the glass plate 5 between the billet 4 and the die 2 and, if desired, between the billet 4 and the ram 3, is preheated by the heater 9 close to the softening temperature of from about 750° C. to about 1000° C., and is simultaneously charged by the hot billet 4.

The weight of the glass plate 5 must be adjusted in accordance with the desired thickness of the glass film, and must assure that the scale layer on the hot billet 4 is absorbed by the glass film by chemical and mechanical bond without impairment of the lubricating effect.

Because of the preheating of the glass plate, according to the invention, the waiting time before the start of the extruding process is substantially reduced and practically eliminated. By electing suitable viscosity values of the lubricant, the extruding velocity is not any longer determined by the lubricant but by the permissible transforming velocity of the steel grade to be worked.

Preheating of the glass plate makes it possible to bind the dusty scale whereby the life span of the extruding tools is decisively increased.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. In a process for making steel tubes and bars by extrusion in an extrusion press having a receiver and using a viscous lubricant of glasslike silicate in the form of a plate between the billet and extrusion die which plate melts at least in part under the influence of the heat of the billet to form a viscous mass, the steps comprising preheating the glass plate to softening temperature separately from the billet and separate from and before the extrusion operation, and inserting the heated plate simultaneously with the hot billet into the receiver of the extrusion press.

2. In a process, as claimed in claim 1, the steps comprising melting glass, forming glass plates from the molten glass, heating the glass plates to softening temperature, and individually inserting a heated plate simultaneously with a hot billet into the receiver of the extrusion press.

3. A plant for use in making steel tubes and bars by extrusion and using a viscous lubricant of glasslike silicate in the form of a plate between the billet and extrusion die which plate melts at least in part under the influence of the heat of the billet to form a viscous mass, the plant comprising an extrusion press, means for heating said glass plate placed adjacent the extrusion press and operable for reheating said glass plate separately from the billet to the desired softening temperature before the extrusion operation and outside of the extrusion apparatus, and means for inserting the heated plate and billet into the receiver of the extrusion press.

4. A plant as claimed in claim 3, wherein said heating means is of the revolving type and capable of heating a plurality of glass plates and delivering same successively to the extrusion apparatus.

5. A plant as claimed in claim 3, wherein said heating means is in the form of a glass melting furnace combined with a molding machine for making glass plates and being operable for preheating said glass plates to the desired softening temperature.

References Cited

UNITED STATES PATENTS

| | | | |
|---|---|---|---|
| 2,538,917 | 1/1951 | Sejournet et al. | 72—42 |
| 2,731,145 | 1/1956 | Kristcher | 72—42 |
| 2,920,972 | 1/1960 | Godron | 106—47 |
| 3,059,769 | 10/1962 | Frost | 72—42 |
| 3,335,589 | 8/1967 | Buffet | 72—253 XR |

OTHER REFERENCES

"Extruding Metal with Glass Lubricants," J. Delcroix Metal Progress, January 1956, pp. 57–60.

CHARLES W. LANHAM, Primary Examiner

E. M. COMBS, Assistant Examiner